US010091813B2

(12) United States Patent
Wang et al.

(10) Patent No.: US 10,091,813 B2
(45) Date of Patent: Oct. 2, 2018

(54) STA INITIATED UPLINK AGGREGATION IN WIRELESS COMMUNICATION SYSTEMS

(71) Applicant: MEDIATEK INC., Hsinchu (TW)

(72) Inventors: James June-Ming Wang, San Marino, CA (US); Ching-Hwa Yu, Tainan (TW); Yuh-Ren Jauh, Taoyuan (TW); Chih-Shi Yee, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 261 days.

(21) Appl. No.: 14/955,241

(22) Filed: Dec. 1, 2015

(65) Prior Publication Data
US 2016/0157266 A1 Jun. 2, 2016

Related U.S. Application Data

(60) Provisional application No. 62/086,312, filed on Dec. 2, 2014.

(51) Int. Cl.
*H04W 74/00* (2009.01)
*H04W 74/08* (2009.01)
(Continued)

(52) U.S. Cl.
CPC ..... *H04W 74/004* (2013.01); *H04W 56/0005* (2013.01); *H04W 72/042* (2013.01);
(Continued)

(58) Field of Classification Search
CPC ............. H04W 84/12; H04W 56/0005; H04W 74/004; H04W 74/06; H04W 72/042;
(Continued)

(56) References Cited

U.S. PATENT DOCUMENTS

2011/0286377 A1* 11/2011 Sampath ............... H04L 1/1671
370/312
2013/0077554 A1 3/2013 Gauvreau et al. ............ 370/312
(Continued)

FOREIGN PATENT DOCUMENTS

EP 2706802 A1 6/2011

OTHER PUBLICATIONS

EPO, Search Report for the EP patent application 15197477.1 dated Apr. 21, 2016 (8 pages).
(Continued)

*Primary Examiner* — Michael Thier
*Assistant Examiner* — Rownak Islam
(74) *Attorney, Agent, or Firm* — Imperium Patent Works; Zheng Jin

(57) ABSTRACT

A method of STA-initiated uplink (UL) aggregation is proposed in a wireless communication system. Under the STA-initiated UL aggregation, an STA can gain access to the medium through contention and after winning the TXOP, it passes the TXOP ownership to its AP to allow it to trigger UL MU transmission. Thus, the AP has increased chance of utilizing the medium while maintains fairness to both legacy APs and STAs. In addition, once AP takes over ownership of the TXOP, if it detects idle secondary channels, it can enable UL aggregation over the idle secondary channels, thereby fully utilizing the entire system bandwidth.

22 Claims, 6 Drawing Sheets

(51) Int. Cl.
  *H04W 72/04*  (2009.01)
  *H04W 56/00*  (2009.01)
  *H04W 74/06*  (2009.01)
  *H04W 72/12*  (2009.01)
  *H04W 84/12*  (2009.01)

(52) U.S. Cl.
  CPC ....... *H04W 74/06* (2013.01); *H04W 74/0833* (2013.01); *H04W 72/121* (2013.01); *H04W 74/00* (2013.01); *H04W 84/12* (2013.01)

(58) Field of Classification Search
  CPC ........... H04W 74/0833; H04W 72/121; H04W 74/04; H04W 56/00; H04W 56/005; H04W 74/00
  USPC .................................................. 370/336, 338
  See application file for complete search history.

(56) References Cited

U.S. PATENT DOCUMENTS

| | | | |
|---|---|---|---|
| 2013/0229996 A1 | 9/2013 | Wang et al. ................. 370/329 |
| 2014/0086227 A1 | 3/2014 | Yang et al. ................. 370/338 |
| 2014/0269544 A1 | 9/2014 | Zhu et al. .................... 370/329 |
| 2015/0124690 A1* | 5/2015 | Merlin .................. H04L 5/0055 370/312 |
| 2016/0100421 A1* | 4/2016 | Ding ................. H04W 72/1268 370/336 |
| 2016/0113034 A1* | 4/2016 | Seok ..................... H04W 74/04 370/329 |
| 2017/0279570 A1* | 9/2017 | Kim ..................... H04L 5/0007 |

OTHER PUBLICATIONS

Achieving Per-Station Fairness in IEEE 802.11 Wireless LANs, Wan-Seon Lim et al., Department of Computer science and Engineering, Pohang University of Science and Technology (POSTECH), Korea (9 pages).

Enhancing MAC Performance with a Reverse Direction Protocol for High-capacity Wireless LANs, Mustafa özdemir et al., 2006 IEEE 64th Vehicular Technology Conference. (5 pages).

* cited by examiner

STA INITIATED UPLINK AGGREGATION IN WIRELESS COMMUNICATION SYSTEMS

CROSS REFERENCE TO RELATED APPLICATIONS

This application claims priority under 35 U.S.C. § 119 from U.S. Provisional Application No. 62/086,312, entitled "STA Initiated UL Aggregation," filed on Dec. 2, 2014, the subject matter of which is incorporated herein by reference.

TECHNICAL FIELD

The disclosed embodiments relate generally to wireless network communications, and, more particularly, to STA initiated uplink aggregation in wireless communication systems.

BACKGROUND

IEEE 802.11 is a set of media access control (MAC) and physical layer (PHY) specification for implementing wireless local area network (WLAN) computer communication in the Wi-Fi (2.4, 3.6, 5, and 60 GHz) frequency bands. The standards and amendments provide the basis for wireless network products using the Wi-Fi frequency bands. For example, IEEE 802.11ac is a wireless networking standard in the 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that considered the improvement of spectrum efficiency to enhance the system throughput in high-density scenarios of wireless devices. At the conclusions of HEW SG, TGax was formed and tasked to work on IEEE 802.11ax standard that will become a successor to IEEE 802.11ac.

In IEEE 802.11ac, a transmitter of a BSS (basis service set) of certain bandwidth is allowed to transmit radio signals onto the shared wireless medium depending on clear channel assessment (CCA) sensing and a backoff or deferral procedure for channel access contention. For a BSS of certain bandwidth, a valid transmission sub-channel shall have bandwidth, allowable in the IEEE 802.11ac, equal to or smaller than the full bandwidth of the BSS and contains the designated primary sub-channel of the BSS. Based on the CCA sensing in the valid transmission bandwidths, the transmitter is allowed to transmit in any of the valid transmission sub-channels as long as the CCA indicates the sub-channel is idle. This dynamic transmission bandwidth scheme allows system bandwidth resource to be efficiently utilized.

An enhanced distributed channel access protocol (EDCA) is used in IEEE 802.11ac as a channel contention procedure for wireless devices to gain access to the shared wireless medium, e.g., to obtain a transmitting opportunity (TXOP) for transmitting radio signals onto the shared wireless medium. The simple CSMA/CA with random back-off contention scheme and low cost ad hoc deployment in unlicensed spectrum have contributed rapid adoption of Wi-Fi systems. Typically, the EDCA TXOP is based on activity of the primary channel(s), while the transmit channel width determination is based on the secondary channel CCA during an interval (PIFS) immediately preceding the start of the TXOP. The basic assumption of EDCA is that a packet collision can occur if a device transmits signal under the channel busy condition when the received signal level is higher than CCA level.

Based on the baseline EDCA medium access rules, AP and non-AP STAs have roughly equal probability of gaining medium contention. In IEEE 802.11ax, AP has higher frequency of accessing the medium. In addition to AP accessing the medium for SU and MU downlink traffic, AP also transmits trigger frames to start the uplink MU traffic, which includes aggregation of uplink resource units from multiple non-AP station in frequency domain (e.g., OFDMA) or uplink spatial streams from multiple non-AP stations. In a dense environment, medium access become difficult due to increased medium traffic and larger number of contending nodes, leading to AP starvation issue. This can significantly penalize 802.11ax network, affecting both downlink and uplink traffic.

If 802.11ax APs employ prioritized EDCA parameters to increase their probability of gaining medium contention, it raises the issues of fairness to the co-existing legacy APs/STAs that operate without prioritized EDCA parameters. As a result, it aggregates the AP starvation issue in the legacy networks when co-exist with 802.11ax networks. Another issue is secondary channel underutilization during uplink access, when STA transmits in narrow channel, or when STA detects secondary channel busy (but AP does not detect secondary channel busy).

A solution is sought.

SUMMARY

A method of STA-initiated uplink (UL) aggregation is proposed in a wireless communication system. Under the STA-initiated UL aggregation, a STA can gain access to the medium through contention and after winning the TXOP, it passes the TXOP ownership to its AP to allow it to trigger UL MU transmission. Thus, the AP has increased chance of utilizing the medium while maintains fairness to both legacy APs and STAB. In addition, once AP takes over ownership of the TXOP, if it detects idle secondary channels, it can enable UL aggregation over the idle secondary channels, thereby fully utilizing the entire system bandwidth.

In one example, an STA gains a TXOP but detects busy condition in secondary channel(s). The STA thus is unable to use full BSS channel width. The STA starts its UL transmission in the primary channel and hands over its TXOP ownership to AP. AP, however, detects some secondary channel idle and desires to enable UL OFDMA with other STAB that also have idle secondary channels. The AP thus initiates and controls UL OFDMA for those other STAs over idle secondary channels using modified ACK/BA frames. The modified ACK/BA frame can also serve as a trigger frame for the UL OFDMA transmission (i.e., synchronizing uplink transmission timing and PPDU TxTime and allocating UL OFDMA resource to STAs), performs uplink error control, performs uplink power control, and regulates transmission opportunity (TXOP) sharing and usage.

In one embodiment, an access point (AP) receives a first uplink transmission from a first wireless station (STA) in a wideband wireless communication network. The first uplink transmission indicates handing over a reserved transmission opportunity (TXOP) ownership of at least a primary channel. The AP transmits a trigger or trigger+ACK frame to a plurality of STAs over multiple sub-bands of the wideband. The AP indicates an uplink OFDMA/MU-MIMO transmission over the multiple sub-bands for the plurality of STAs sharing the same TXOP. Each trigger frame serves as synchronizing the uplink transmission timing and packet transmit time, and for allocating uplink resources to the plurality of STAB.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
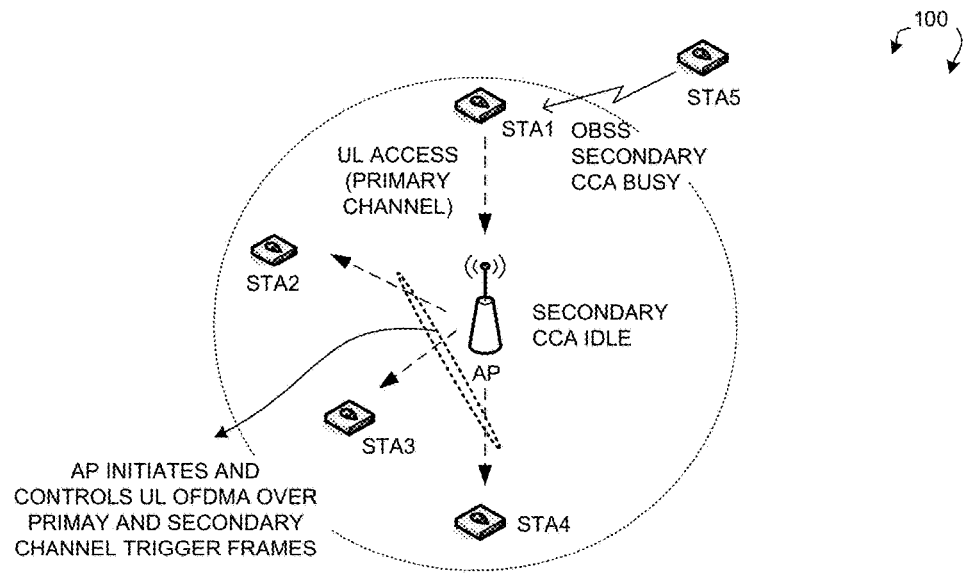
FIG. 1 illustrates a wireless communications network with STA-initiated uplink aggregation in accordance with one novel aspect.

FIG. 1 illustrates a wireless communications network 100 with STA-initiated uplink aggregation in accordance with one novel aspect. Wireless communications network 100 comprises an access point AP serving a basic service set BSS having a plurality of wireless stations STA1, STA2, STA3, and STA4. In IEEE 802.11ax, uplink (UL) and downlink (DL) user aggregation has been introduced to increase network efficiency in the dense deployed environment. As a result, AP has higher frequency of accessing the medium. In addition to accessing the medium for single-user (SU) and multi-user (MU) DL traffic, AP also transmits trigger frames to start the UL MU traffic. Therefore, AP starvation issue might be more severe in IEEE 802.11ax. In a dense environment, medium access become difficult due to increased medium traffic and larger number of contending nodes. This can significantly penalize 802.11ax network.

In one novel aspect, an STA-initiated UL aggregation transmission scheme is proposed. Under the STA-initiated UL aggregation, STA1 gains a TXOP via channel contention can indicate in its UL PPDU to let AP take control of the TXOP and to allow sharing subsequent UL transmission with other STAs under the condition that AP continuing to allocate UL resources to the STA1 within the same TXOP until the STA1 finishes UL transmission. Thus, the AP has larger chance of gaining medium access through its STAs and triggering UL aggregation while maintains fairness to both legacy APs and STAB. After AP takes control of TXOP, it uses trigger frames to allocate frequency or spatial resource units and UL transmission time for STA1's next UL transmission and to allocate un-allocated frequency or spatial resource units with the same UL transmission time to enable UL MU transmission of other STAB. Note that if STA1 finishes it UL transmission before the end of TXOP, AP can continue to use the TXOP to trigger UL transmission of other STAs, thus extending beyond the STA1 medium utilization during the same TXOP.

In addition, the UL aggregation can be performed over idle secondary channels, thereby fully utilizing the entire system bandwidth. In the example of FIG. 1, STA1 starts an uplink access, e.g., with a data frame or control frame. Due to an interference from an overlapping BSS (OBSS) station STA5, STA1 detects busy condition in secondary channel(s). STA1 thus is unable to use full BSS channel width. However, AP detects some secondary channel idle (one embodiment is secondary channel sensing during PIFS prior to STA1 transmission or another embodiment is secondary channel sensing during reception of STA1's UL transmission) and desires to enable UL OFDMA with other STAs that also have idle secondary channels. For example, AP initiates and controls UL OFDMA for STA2-STA4 over idle secondary channels using trigger frames.

Figure 2:
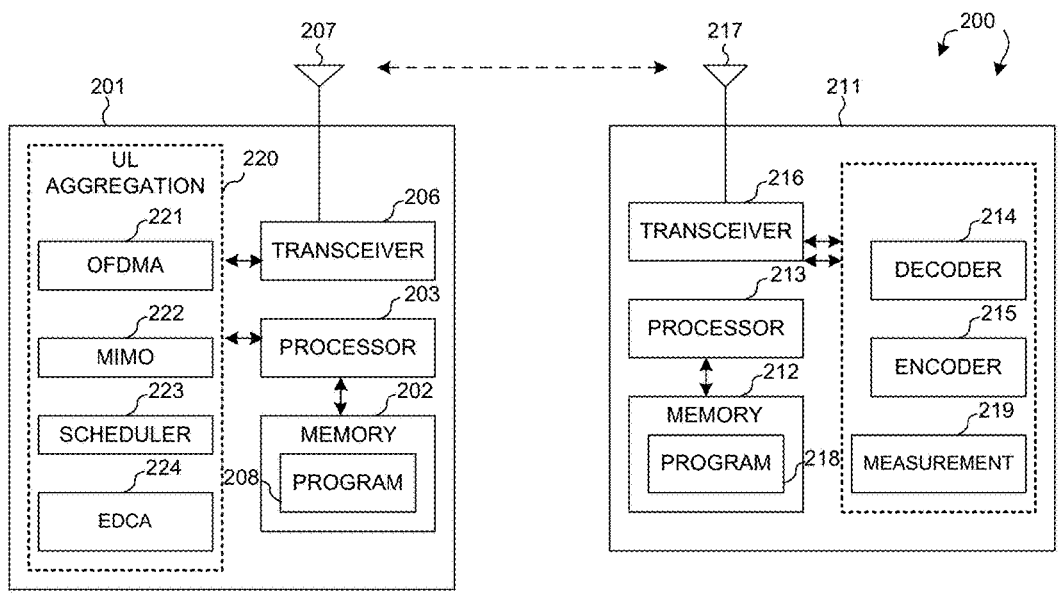
FIG. 2 is a simplified block diagram of a wireless transmitting device and a wireless receiving device in accordance with one novel aspect.

FIG. 2 is a simplified block diagram of wireless stations 201 and 211 in accordance with a novel aspect. For wireless device 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in wireless device 201. Memory 202 stores program instructions and data 208 to control the operations of the wireless device.

Similar configuration exists in wireless device 211 where antenna 217 transmits and receives RF signals. RF transceiver module 216, coupled with the antenna, receives RF signals from the antennae, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in wireless device 211. Memory 212 stores program instructions and data 218 to control the operations of the wireless device.

The wireless devices 201 and 211 also include several functional modules and circuits to perform certain embodiments of the present invention. In the example of FIG. 2, wireless device 211 is a wireless communications station (e.g., a non-AP STA) that includes an encoder 215 for encoding and transmitting a frame to device 201, a decoder 214 for receiving and decoding a frame from device 201, and a measurement module 219 for measuring channel qualities and estimating channel conditions. Wireless device 201 is another wireless communications station (e.g., an AP) that includes an uplink aggregation module 220. The uplink aggregation module 220 further comprises an OFDMA handler 221 for scheduling uplink OFDMA for multiple STAB, a MU-MIMO handler 222 for scheduling uplink MU-MIMO for multiple STAB, a resource allocator 223 for allocating uplink resources for STAB, and an EDCA handler 224 contends the wireless medium with other STAs through a random backoff EDCA procedure. AP 201 also comprises the functional modules and circuits of a non-AP STA. The different functional modules and circuits can be configured and implemented by software, firmware, and hardware, or any combination thereof. The function modules and circuits, when executed by the processors 203 and 213 (e.g., via executing program codes 208 and 218), allow wireless stations 201 and 211 to perform certain embodiments of the present invention.

Figure 3:
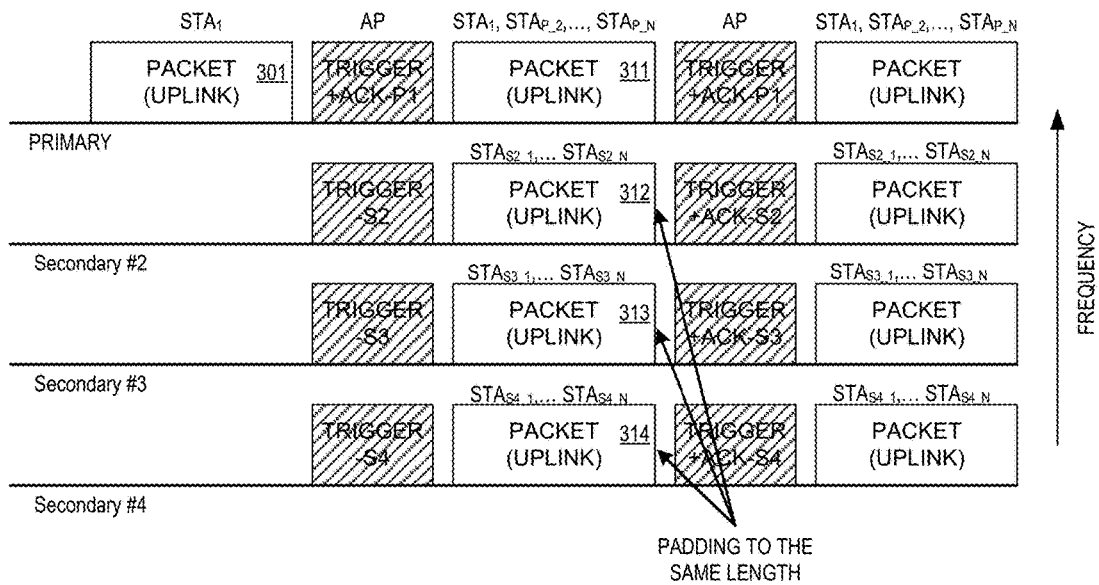
FIG. 3 illustrates one example of an uplink OFDMA transmission that is initiated by an STA. The STA only transmits over the primary channel. The AP initiates and controls UL OFDMA over detected idle secondary channels using modified ACK/BA frames.

FIG. 3 illustrates one example of an uplink OFDMA transmission that is initiated by $STA_1$. $STA_1$ only transmits over the primary channel and lets AP take over TXOP control after first UL PPDU. The AP initiates and controls UL OFDMA over both primary and detected idle secondary channels using trigger frames. As illustrated in FIG. 3, $STA_1$ starts an uplink access and transmits an uplink packet 301 over the primary channel. However, AP detects some secondary channel idle (PIFS prior to $STA_1$ transmission) and desires to enable UL OFDMA with other STAB. For example, AP initiates and controls UL OFDMA for $STA_1$, $STA_{P\_2}$, . . . , $STA_{P\_N}$ over primary channel using trigger frame TRIGGER+ACK-P1 and $STA_{S2\_1}$-$STA_{S2\_N}$, $STA_{S3\_1}$, $STA_{S3\_N}$, $STA_{S4\_1}$, $STA_{S4\_N}$ over idle secondary channels #2 to #4 using trigger frames TRIGGER-S2 to TRIGGER-S4, respectively. As a result, $STA_1$, $STA_{P\_2}$, . . . , $STA_{P\_N}$ transmits uplink packet over the primary channel, and $STA_{S2\_1}$-$STA_{S2\_N}$, $STA_{S3\_1}$-$STA_{S3\_N}$, $STA_{S4\_1}$-$STA_{S4\_N}$ transmit uplink packet 312, 313, and 314 over secondary channels #2, #3, and #4 respectively, each padded to the same length as uplink packet 311 transmitted by $STA_1$. The TRIGGER+ACK-P1, TRIGGER+ACK-S2, TRIGGER+ACK-S3, TRIGGER+ACK-S4 frame serves as a trigger frame and ACK frame for the UL MU transmission (i.e., synchronize uplink transmission timing and PPDU TxTime and allocate UL OFDMA resource units to STAs), performs uplink ACK, performs uplink power control, and regulates transmission opportunity (TXOP) sharing and usage.

The STA-initiated UL OFDMA transmission starts with an uplink user (called the TXOP initiator) gaining an EDCA TXOP. The TXOP initiator shall at least occupy the primary channel and hands over TXOP control to AP under the condition that AP continue to allocate resource to the TXOP initiator. AP allocates resource in initiator's occupied channels and, if it has idle secondary channel(s), also allocates resource in idle secondary channels to share with other STAs in UL aggregation (TXOP sharing). AP solicits or assigns other user to use the frequency domain resources (OFDMA) or spatial resources in trigger frame and indicates the next PPDU TxTime.

Figure 4:
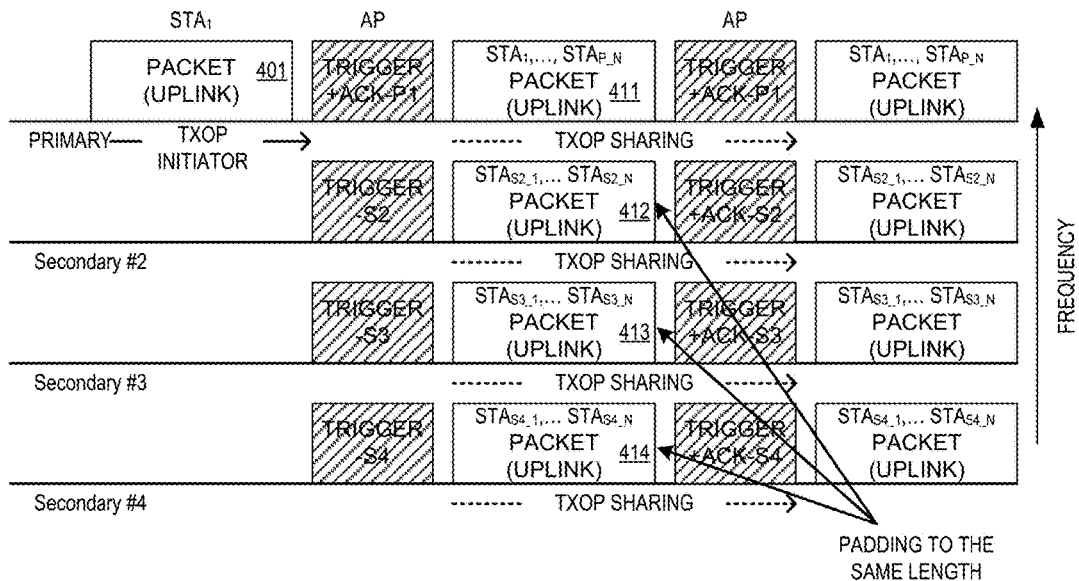
FIG. 4 illustrates another example of an uplink OFDMA transmission that is initiated by an STA. The STA only transmits over the primary channel. The NAV is reserved for all secondary channels by setting the duration of each ACK frame.

FIG. 4 illustrates another example of an uplink OFDMA transmission that is initiated by an STA. The STA-initiated UL OFDMA transmission starts with an uplink user (called the TXOP initiator) gaining an EDCA TXOP. The TXOP initiator shall at least occupy the primary channel and hands over TXOP control to AP under the condition that AP continue to allocate resource to the TXOP initiator. AP allocates resource in initiator's occupied channels and, if it has idle secondary channel(s), also allocates resource in idle secondary channels to share with other STAs in UL aggregation (TXOP sharing). AP solicits or assigns other users to use the frequency domain resources (OFDMA) or spatial resources in ACK or BA frame and indicates the next PPDU TxTime.

In the example of FIG. 4, $STA_1$ starts an uplink access and transmits an uplink packet 401 over the primary channel. $STA_1$ thus becomes the TXOP initiator and transmits over the primary channel. AP initiates and controls UL OFDMA for $STA_1$, $STA_{P\_2}$, . . . , $STA_{P\_N}$ over primary channel using trigger frame TRIGGER+ACK-P1 and $STA_{S2\_1}$-$STA_{S2\_N}$, $STA_{S3\_1}$-$STA_{S3\_N}$, $STA_{S4\_1}$-$STA_{S4\_N}$ over idle secondary channels #2 to #4 using trigger or trigger+ACK frames TRIGGER+ACK-P1, TRIGGER+ACK-S2, TRIGGER+ACK-S3, TRIGGER+ACK-S4, respectively. As a result, $STA_{P\_2}$, . . . , $STA_{P\_N}$, $STA_{S2\_1}$-$STA_{S2\_N}$, $STA_{S3\_1}$-$STA_{S3\_N}$, $STA_{S4\_1}$-$STA_{S4\_N}$ share the same TXOP, and transmits uplink packet 412, 413, and 414, each padded to the same length as uplink packet 411 transmitted by $STA_1$. In addition, TRIGGER+ACK-P1, TRIGGER+ACK-S2, TRIGGER+ACK-S3, TRIGGER+ACK-S4 each has a duration field, which is set for reserving the NAV for secondary channels #2, #3, and #4, respectively.

In IEEE 802.11ac DL MU-MIMO, the access category (AC) associated with the EDCAF that gains an EDCA TXOP becomes the primary AC and TXOP sharing. It allows traffic from secondary ACs to be included in the DL MU-MIMO, targeting up to four STAB. Similarly, for UL MU TXOP sharing, it is possible to extend the duration beyond that of the initiating UL STA (up to the TXOP limit). When the initiating UL STA finishes transmission, AP can trigger other STAs to continue the transmission in the primary channel. Note that it is necessary to maintain the primary channel transmission in order to retain control of the wireless medium.

Figure 5:
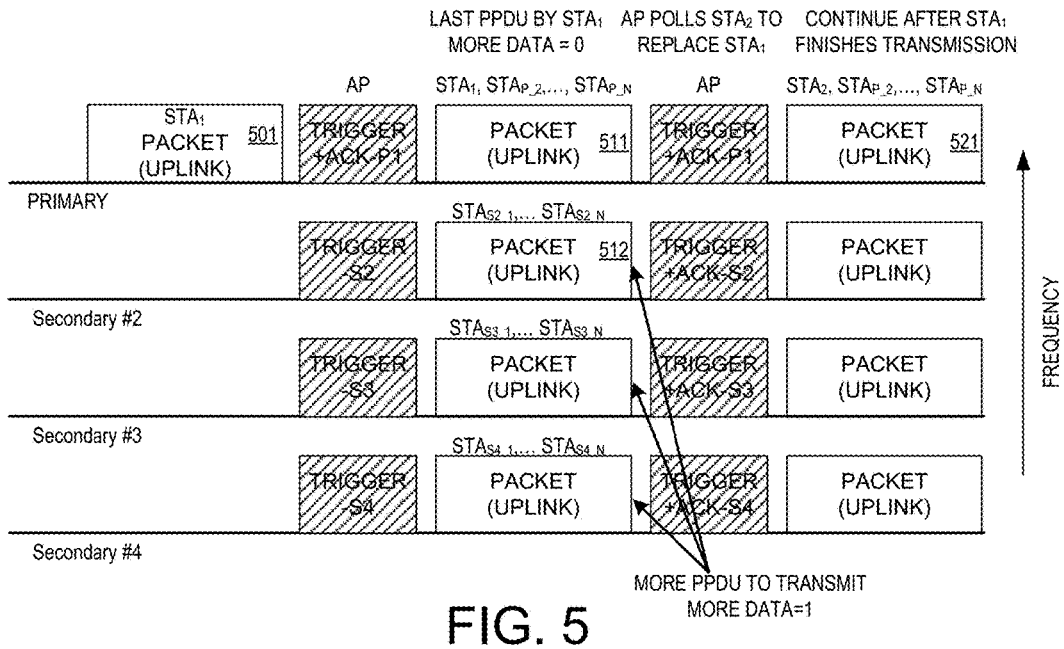
FIG. 5 illustrates one embodiment of TXOP initiation and sharing for STA-initiated uplink OFDMA transmission.

FIG. 5 illustrates one embodiment of TXOP initiation and sharing for STA-initiated uplink OFDMA transmission. In the example of FIG. 5, $STA_1$ starts an uplink access and transmits an uplink packet 501 over the primary channel. $STA_1$ is the TXOP initiator. AP initiates and controls UL OFDMA for other STAs over using trigger or trigger+ACK frames. If the TXOP initiator STA1 completes its uplink transmission before the TXOP limit, AP can direct one or more other users to primary channel and extend the usage of the TXOP. To accomplish this, the candidate user needs to let AP know that it has more UL PPDU to transmit and its primary channel condition is good in the UL frame before the TXOP initiator finishes transmission.

For example, for uplink packet 511, it is the last PPDU transmitted by $STA_1$, which is indicated by (More Data=0). On the other hand, for uplink 512, it indicates that $STA_2$ has more PPDU to transmit with (More Data=1). When AP learns that the TXOP initiator ($STA_1$) is to finish its uplink transmission (as indicated by More Data bit=0 in frame control), it signals to the candidate user (e.g., $STA_2$) to switch over to the primary channel in the ensuing trigger frame (TRIGGER+ACK-P1) and to continue the uplink frame transmission thereby extending the TXOP duration. At the next PPDU transmit time, the TXOP initiator ($STA_1$) has ended its transmission and other STAs continue to transmit under the direction of AP. Note that other STAs can continue their uplink transmission until the end of TXOP limit.

Figure 6:
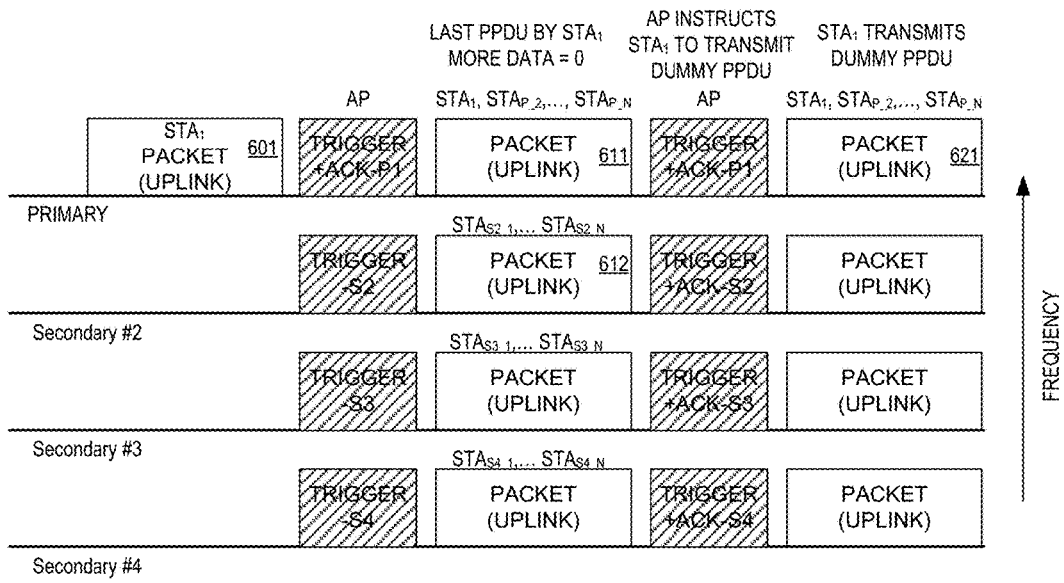
FIG. 6 illustrates another embodiment of TXOP initiation and sharing for STA-initiated uplink OFDMA transmission.

FIG. 6 illustrates another embodiment of TXOP initiation and sharing for STA-initiated uplink OFDMA transmission. In the embodiment of FIG. 6, if AP cannot find one or more STAs to take over the primary channel, it can also instruct the primary channel STAs to continue with dummy PPDU transmission to retain control over the wireless medium. For example, for uplink packet 611, it is the last PPDU transmitted by STA$_1$, which is indicated by (More Data=0). AP then instructs STA$_1$ to continue to transmit dummy PPDUs in the next PPDU transmit time.

Figure 7:
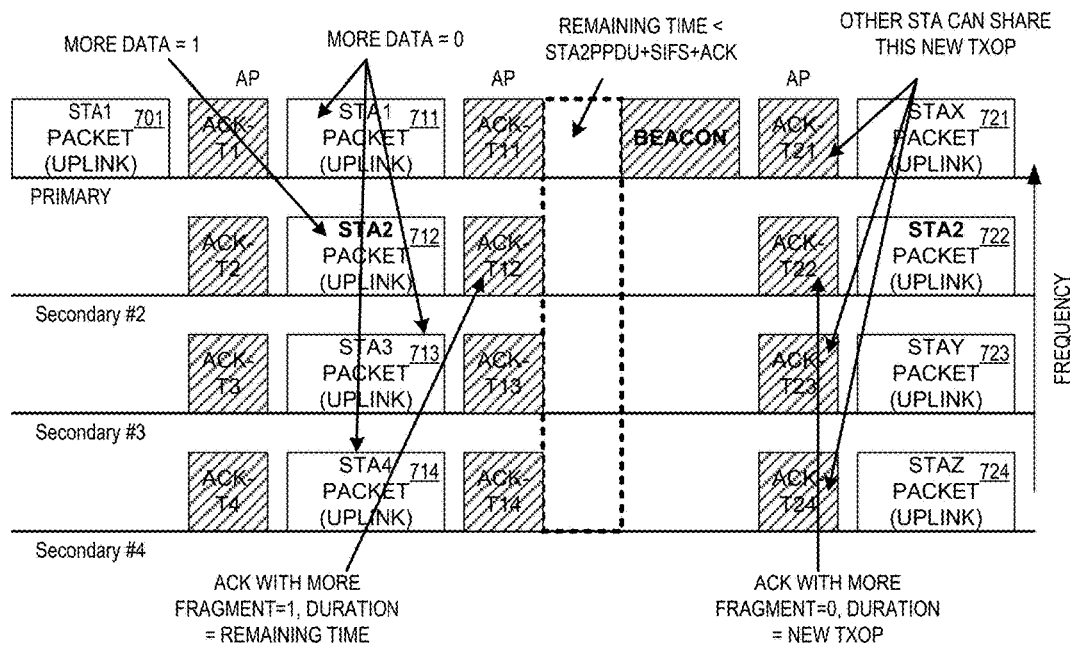
FIG. 7 illustrates one embodiment of TXOP sharing transmission retention for STA-initiated uplink OFDMA transmission.

FIG. 7 illustrates one embodiment of TXOP sharing transmission retention for STA-initiated uplink OFDMA transmission. TXOP cannot be assigned across TBTT, STA B thus may not be able to finish transmission within the remaining TXOP time. Transmission retention can be performed by setting the ACK frame with MORE FRAGMENT=1 with duration=protected time. In the example of FIG. 7, STA1 starts an uplink access and transmits an uplink packet 701 over the primary channel. AP initiates and controls UL OFDMA for STA2-STA4 over idle secondary channels #2 to #4 using modified ACK frames ACK-T2 to ACK-T4, respectively. As a result, STA2, STA3 and STA4 shares the same TXOP, and transmits uplink packet 712, 713, and 714, each padded to the same length as uplink packet 611 transmitted by STA1. For STA1, STA3, and STA4, they all have completed transmission, and uplink packets 711, 713, and 714 are the last PPDU (MORE DATA=0). For STA2, however, it has more PPDU to transmit after uplink packet 712 (MORE DATA=1). However, the Remaining Time for uplink transmission is less than (STA2 PPDU+SIFS+ACK). Therefore, in ACK-T12, AP acknowledges with MORE FRAGMENT=1 and duration=Remaining Time. After beacon transmission by the AP, in ACK-T22, AP acknowledges with MORE FRAGMENT=0 and duration=New TXOP. Upon receiving ACK-T22, STA2 transmits uplink packet 722. If multicast traffic, DMS, or buffered packets transmission following the beacon exists, then this ACK-T22 will be transmitted after PIFS of transmission of those packets. Note that other STAs can share this new TXOP with STA2. For example, STAX, STAY, and STAZ transmit uplink packets 721, 723, and 724 sharing the new TXOP.

For STA-initiated uplink OFDMA transmission, AP can allocate the PPDU TxTime of secondary channel(s) to a STA or STAs by signaling STA address in the trigger frame prior to the next UL PPDU TxTime. For UL random access, however, AP might not be able to decode multiple OFDM PPDUs by different STAs (collision) in the same sub-channel. AP receiver auto gain control (AGC) might not work properly since multiple OFDMA transmissions in sub-channels are not phase aligned. Asynchronous OFDMA transmission within an UL PPDU TxTime could affect the receiver AGC operation or cause saturation in the receive chain. A code-division multiple access (CDMA) or narrower-band OFDMA (<20 MHz sub-channels) enables more efficient UL contention in secondary channels but are not backward compatible since legacy STAB might not detect CDMA or narrower-band OFDMA. Therefore, AP can enable more efficient UL contention via AP controlled UL random access.

Figure 8:
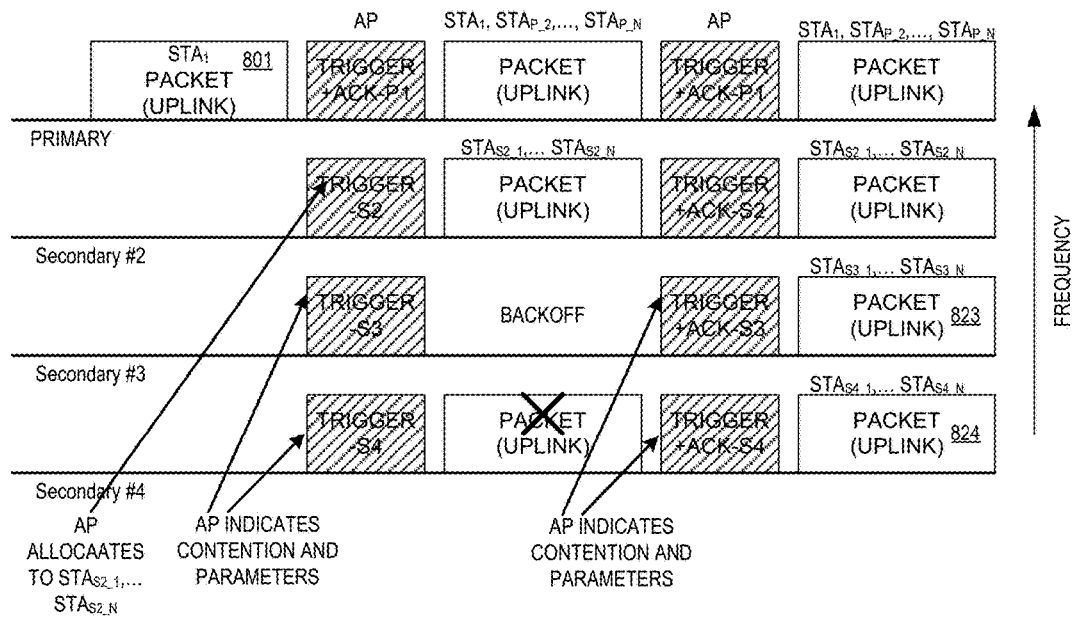
FIG. 8 illustrates one embodiment of AP controlled UL OFDMA contention for STA-initiated uplink OFDMA transmission.

FIG. 8 illustrates one embodiment of AP controlled UL OFDMA contention for STA-initiated uplink OFDMA transmission. In the example of FIG. 8, STA$_1$ starts an uplink access and transmits an uplink packet 801 over the primary channel. AP can have reasonable expectation of potential number of nodes contending for UL based on observation of medium prior to TXOP. For example, AP allocates resource to STA$_1$, STA$_{P\_2}$ . . . STA$_{P\_N}$ over primary channel and STA$_{S2\_1}$, STA$_{S2\_N}$ for secondary channel #2 for uplink transmission. AP also indicates contention and its related parameters via TRIGGER-S3, TRIGGER-S4 for secondary channel #3 and secondary channel #4. Through uplink random contention, as a result, STA$_{S3\_1}$-STA$_{S\_N}$ transmit uplink packets 823 over secondary channel #3, and STA$_{S4\_1}$, STA$_{S4\_N}$ transmit uplink packets 824 over secondary channel #4 during the TXOP. By signaling the UL OFDMA access parameters in the ACK/BA prior to PPDU TxTime, AP can speed up or slow down UL contention to optimize channel usage or reduce collision by adjusting contention parameters such as window size, etc.

Figure 9:
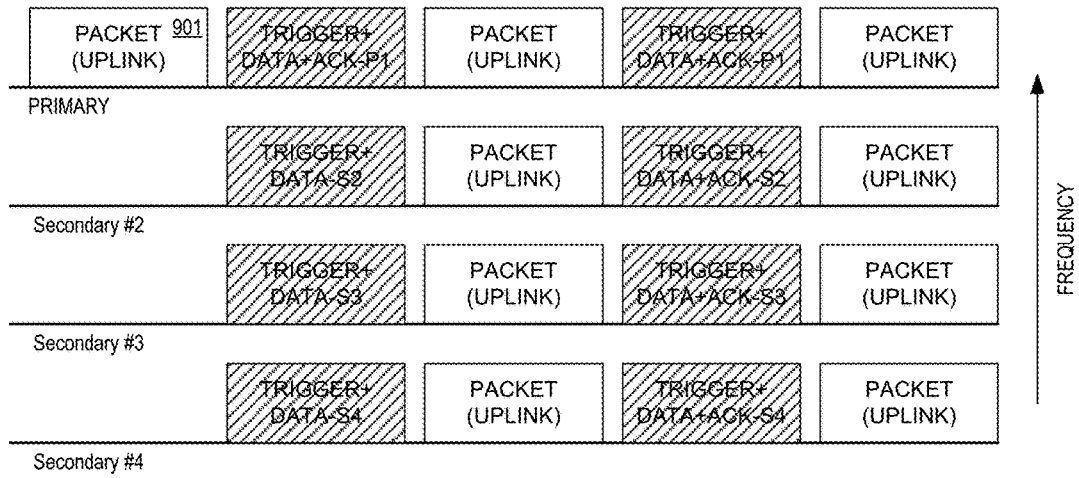
FIG. 9 illustrates Bi-direction traffic via STA-initiated uplink transmission or AP initiated downlink transmission.

FIG. 9 illustrates Bi-direction traffic via STA-initiated uplink transmission or AP initiated downlink transmission. In addition to UL access starvation, AP may also suffer from DL access starvation. By using bi-directional data, AP can transmit DL-MU to multiple users. In the example of FIG. 9, STA1 starts an uplink access and transmits an uplink packet 901 over the primary channel. AP initiates and controls UL OFDMA for STA$_1$, STA$_{P\_2}$ . . . STA$_{P\_N}$ over primary channel and STA$_{S2\_1}$-STA$_{S2\_N}$, STA$_{S3\_1}$-STA$_{S3\_N}$, STA$_{S4\_1}$-STA$_{S4\_N}$ over secondary channels #2 to #4 using trigger frames. Furthermore, to reduce DL starvation, AP can transmit downlink data together with the TRIGGER+ACK frames.

Figure 10:
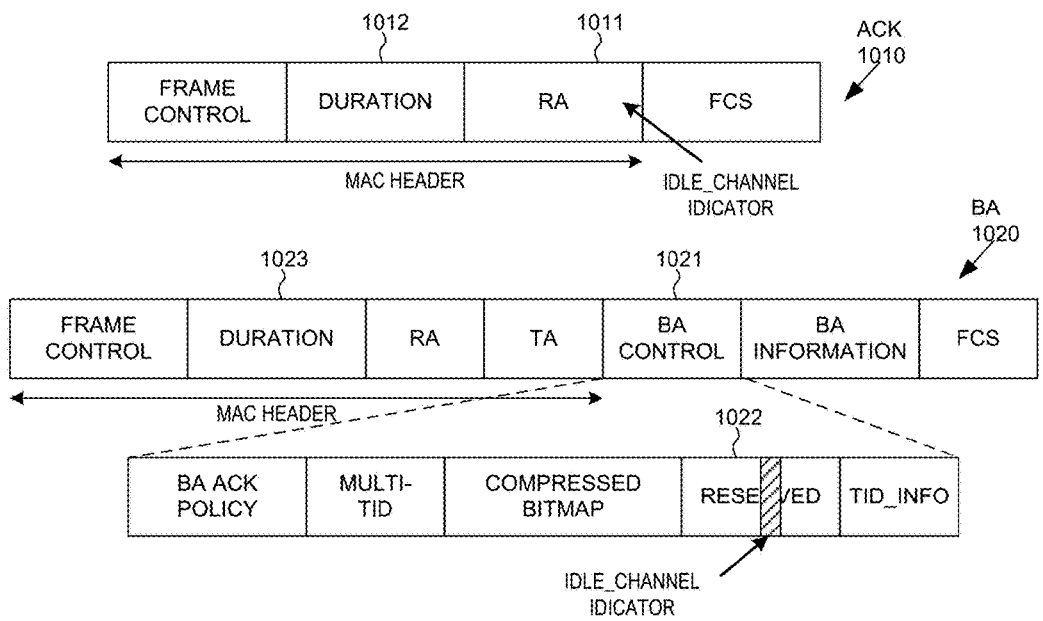
FIG. 10 illustrates embodiments of a modified ACK frame and block ACK frame, which can be used to control STA-initiated UL OFDMA transmission.

FIG. 10 illustrates embodiments of a modified acknowledgement frame ACK 1010 and a block acknowledgement frame BA 1020, which can be used as trigger frame to control STA-initiated UL OFDMA or UL MU-MIMO transmission. ACK 1010 comprises a frame control field, a duration field, a reception address (RA) field, and a frame check sum (FCS) field. The RA field 1011 further comprises an idle-channel indicator. ACK 1010 is generally an individually addressed frame. By setting the Individual or Group bit to 1 in RA filed 1011 of ACK 1010 (similar to bandwidth signaling TA in RTS frames or other control frames), this would serve as an indicator for IEEE 802.11ax STAs that the secondary channel(s) is available at AP. Setting the Individual or Group bit to 1 would cause legacy STAs not to recognize the sender of the ACK frame (which is AP). However, this would not cause any adverse effects. The remaining bits of the RA field 1011 indicate the TAs of the STAs for the subsequent UL OFDMA transmission. Additional idle secondary channel indication can be in the scrambling sequence (e.g., similar to BW signaling TA). The duration field 1012 is used to indicate the next UL OFDMA PPDU TxTime.

BA 1020 comprises a frame control field, a duration field, an RA field, a TA field, a BA control field, a BA information field, and an FCS field. The BA control field 1021 further comprises a BA ACK policy field, a multi-TID field, a compressed bitmap, a reserved field, and a TID_INFO field. The reserved field 1022 comprises a reserved bit that is used to indicate availability of idle secondary channel. The scrambling sequence can be used to indicate the idle secondary channel. The duration field 1023 is used to indicate the duration of the next UL OFDMA PPDU TxTime.

Figure 11:
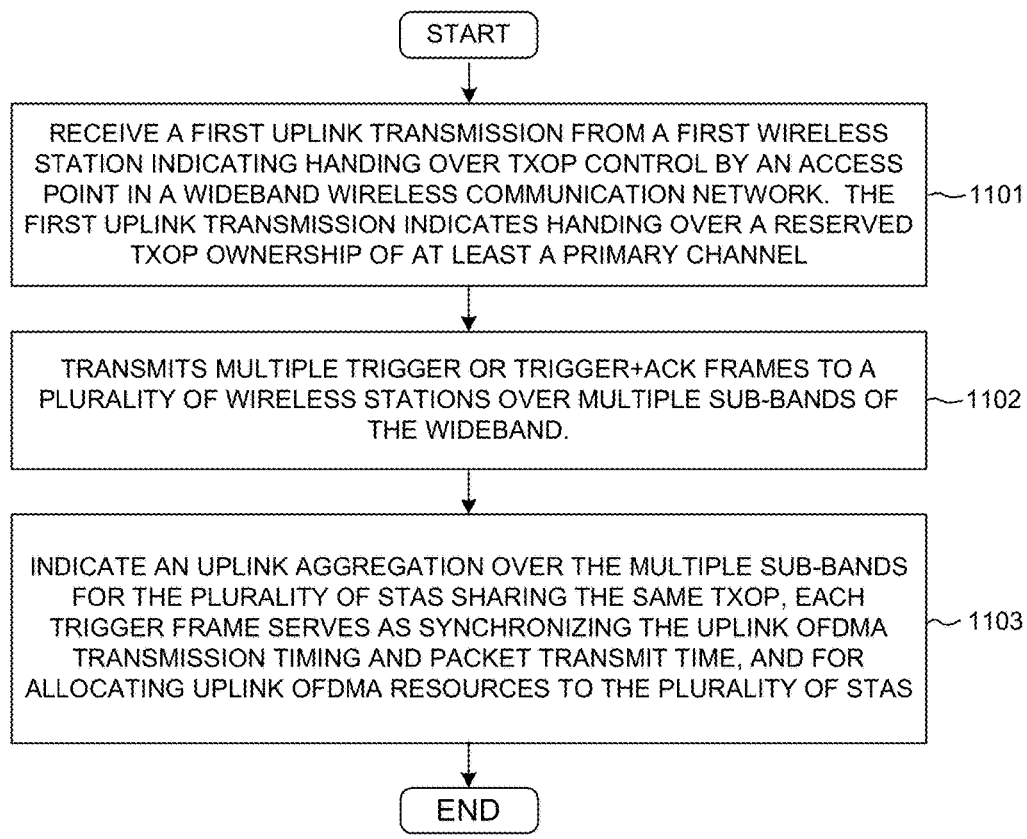
FIG. 11 is flow chart of a method of STA-initiated uplink aggregation in a wireless communications system in accordance with one novel aspect.

FIG. 11 is flow chart of a method of STA-initiated uplink aggregation in a wireless communications system in accordance with one novel aspect. In step 1101, an access point (AP) receives a first uplink transmission from a first wireless station (STA) in a wideband wireless communication network. The first uplink transmission indicates handing over a reserved transmission opportunity (TXOP) ownership of at least a primary channel. In step 1102, the AP transmits a trigger or trigger+ACK frame to a plurality of STAs over multiple sub-bands of the wideband. In step 1103, the AP indicates an uplink OFDMA/MU-MIMO transmission over the multiple sub-bands for the plurality of STAs sharing the same TXOP. Each trigger frame serves as synchronizing the uplink transmission timing and packet transmit time, and for allocating uplink resources to the plurality of STAB.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a first uplink transmission from a first wireless station (STA) by an access point (AP) in a wideband wireless communication network, wherein the first uplink transmission indicates handing over a reserved transmit opportunity (TXOP) ownership of at least a primary channel, wherein a secondary channel is busy for the first STA;
transmitting multiple trigger frames to a plurality of wireless stations (STAs) over multiple subbands of the wideband, wherein the secondary channel is idle for the AP; and
initiating an uplink aggregation over the multiple subbands for the plurality of STAs sharing the same TXOP, wherein each trigger frame serves as synchronizing the uplink aggregation transmission timing and packet transmit time, and as allocating uplink aggregation resources to the plurality of STAs, wherein at least some of the plurality of STAs uses the secondary channel for the uplink aggregation.

2. The method of claim 1, wherein the AP becomes the TXOP owner to initiate the UL aggregation for the plurality of STAs.

3. The method of claim 1, wherein the AP continues to allocate resource to the first wireless station (STA) within the same TXOP.

4. The method of claim 1, wherein the uplink aggregation comprises either an uplink orthogonal frequency division multiple access (OFDMA) transmission or an uplink multi-user multiple input multiple output (MU-MIMO) transmission over multiple secondary sub-channels.

5. The method of claim 1, wherein the AP signals a second STA to transmit over the primary channel when the first STA finishes uplink data transmission.

6. The method of claim 1, wherein the AP instructs the first STA to transmit dummy PHY protocol data unit(s) (PPDU(s)) after the first STA finishes uplink data transmission.

7. The method of claim 1, wherein a trigger frame to a second STA before a beacon transmission indicates fragmentation, and wherein the AP starts a new TXOP for the second STA to complete data transmission after the beacon transmission.

8. The method of claim 1, wherein the AP uses a subset of the multiple trigger frames to indicate contention and related parameters over a subset of the multiple subbands for random access.

9. The method of claim 1, wherein the AP transmits downlink data to the plurality of STAs via the multiple trigger frames.

10. The method of claim 1, wherein each trigger frame includes an ACK frame comprising a received address (RA) field, and wherein the RA field comprises an Idle Channel Indicator indicating that a secondary channel is available at the AP.

11. The method of claim 1, wherein each trigger frame includes a Block ACK (BA) frame comprising a reserved field in a BA control field, and wherein the reserved field comprises an Idle Channel Indicator indicating that a secondary channel is available at the AP.

12. An access point (AP), comprising:
a receiver that receives a first uplink transmission from a first wireless station (STA) in a wideband wireless communication network, wherein the first uplink transmission indicates handing over a reserved transmit opportunity (TXOP) ownership of at least a primary channel, wherein a secondary channel is busy for the first STA;
a transmitter that transmits multiple trigger frames to a plurality of wireless stations (STAs) over multiple subbands of the wideband, wherein the secondary channel is idle for the AP; and
an uplink aggregation handling circuit that initiates an uplink aggregation over the multiple subbands for the plurality of STAs sharing the same TXOP, wherein each trigger frame serves as synchronizing the uplink aggregation transmission timing and packet transmit time, and as allocating uplink aggregation resources to the plurality of STAs, wherein at least some of the plurality of STAs uses the secondary channel for the uplink aggregation.

13. The AP of claim 12, wherein the AP becomes the TXOP owner to initiate the UL aggregation for the plurality of STAs.

14. The AP of claim 12, wherein the AP continues to allocate resource to the first wireless station (STA) within the same TXOP.

15. The AP of claim 12, wherein the uplink aggregation comprises either an uplink orthogonal frequency division multiple access (OFDMA) transmission or an uplink multi-user multiple input multiple output (MU-MIMO) transmission over multiple secondary sub-channels.

16. The AP of claim 12, wherein the AP signals a second STA to transmit over the primary channel when the first STA finishes uplink data transmission.

17. The AP of claim 12, wherein the AP instructs the first STA to transmit dummy PHY protocol data unit(s) (PPDU(s)) after the first STA finishes uplink data transmission.

18. The AP of claim 12, wherein a trigger frame to a second STA before a beacon transmission indicates fragmentation, and wherein the AP starts a new TXOP for the second STA to complete data transmission after the beacon transmission.

19. The AP of claim 12, wherein the AP uses a subset of the multiple trigger frames to indicate contention and related parameters over a subset of the multiple subbands for random access.

20. The AP of claim 12, wherein the AP transmits downlink data to the plurality of STAs via the multiple trigger frames.

21. The AP of claim 12, wherein each trigger frame includes an ACK frame comprising a received address (RA) field, and wherein the RA field comprises an Idle Channel Indicator indicating that a secondary channel is available at the AP.

22. The AP of claim 12, wherein each trigger frame includes a Block ACK (BA) frame comprising a reserved field in a BA control field, and wherein the reserved field comprises an Idle Channel Indicator indicating that a secondary channel is available at the AP.

* * * * *